United States Patent [19]

Fukushi et al.

[11] Patent Number: 5,855,977
[45] Date of Patent: Jan. 5, 1999

[54] MULTI-LAYER COMPOSITIONS COMPRISING A FLUOROPOLYMER

[75] Inventors: Tatsuo Fukushi, Tokyo, Japan; Keizo Yamanaka, Maplewood; Paul F. Tuckner, Woodbury, both of Minn.

[73] Assignee: Minnesota Mining and Manufacturing Company, St. Paul, Minn.

[21] Appl. No.: 703,311

[22] Filed: Aug. 26, 1996

[51] Int. Cl.$^6$ .............................. B32B 1/02; B32B 1/08; B32B 27/10; B32B 31/00

[52] U.S. Cl. ...................... 428/36.6; 428/421; 428/422; 156/244.13; 156/308.4; 156/333; 138/140; 138/141; 138/146; 141/1; 264/171.26; 264/171.28; 264/173.6; 264/173.19

[58] Field of Search .................................... 428/421, 422, 428/35.7, 36.6; 156/326, 333, 308.2, 308.4, 308.8, 244.11, 244.13; 427/412.4, 299, 302, 322; 264/510, 512, 513, 514, 171.26, 171.28, 173.16, 173.19; 138/141, 140, 145, 146

[56] References Cited

U.S. PATENT DOCUMENTS

| | | | |
|---|---|---|---|
| 3,507,844 | 4/1970 | Wood | 260/87.7 |
| 3,551,025 | 12/1970 | Blingham et al. | 350/105 |
| 3,923,574 | 12/1975 | Vecauteren | 156/192 |
| 4,335,238 | 6/1982 | Moore et al. | 526/254 |
| 4,348,312 | 9/1982 | Tung | 428/144 |
| 4,548,867 | 10/1985 | Ueno et al. | 428/409 |
| 4,678,842 | 7/1987 | Sandler | 525/359.1 |
| 4,740,562 | 4/1988 | Menke et al. | 525/366 |
| 4,758,618 | 7/1988 | Ito et al. | 524/430 |
| 4,933,060 | 6/1990 | Prohaska et al. | 204/192.36 |
| 5,047,287 | 9/1991 | Horiuchi et al. | 428/248 |
| 5,135,985 | 8/1992 | Hoess et al. | 525/205 |
| 5,170,077 | 12/1992 | Martucci | 174/47 |
| 5,242,976 | 9/1993 | Strassel et al. | 525/72 |
| 5,284,184 | 2/1994 | Noone et al. | 138/121 |
| 5,383,087 | 1/1995 | Noone et al. | 361/215 |
| 5,389,725 | 2/1995 | Bando | 525/92 |
| 5,391,426 | 2/1995 | Wu | 428/246 |
| 5,411,779 | 5/1995 | Nakajima et al. | 428/36.91 |
| 5,472,784 | 12/1995 | Rober et al. | 428/421 |
| 5,474,822 | 12/1995 | Rober et al. | 428/36.91 |
| 5,500,263 | 3/1996 | Rober et al. | 428/36.6 |
| 5,512,225 | 4/1996 | Fukushi | 264/127 |
| 5,512,342 | 4/1996 | Rober et al. | 428/36.91 |
| 5,656,121 | 8/1997 | Fukushi | 156/326 |
| 5,658,670 | 8/1997 | Fukushi et al. | 428/421 |

FOREIGN PATENT DOCUMENTS

| | | | |
|---|---|---|---|
| 0 045 070 | 2/1982 | European Pat. Off. | |
| 0 185 590 | 6/1986 | European Pat. Off. | |
| 0 507 468 | 10/1992 | European Pat. Off. | |
| 0 523 644 | 1/1993 | European Pat. Off. | |
| 0 545 368 | 6/1993 | European Pat. Off. | |
| 0 551 094 | 7/1993 | European Pat. Off. | |
| 0 559 445 | 9/1993 | European Pat. Off. | |
| 38 40 514 | 6/1990 | Germany | B32B 27/06 |
| 6-087935-A | 3/1994 | Japan | C08F 8/18 |
| 2 052 381 | 1/1981 | United Kingdom | B32B 27/08 |
| 2 204 932 | 11/1988 | United Kingdom | F16L 11/06 |
| WO 94/12580 | 6/1994 | WIPO | C09D 127/12 |
| WO 94/25524 | 11/1994 | WIPO | C08L 33/24 |
| WO 95/00588 | 1/1995 | WIPO | C08L 33/16 |
| WO 95/11464 | 4/1995 | WIPO | G02B 5/124 |
| WO 95/11466 | 4/1995 | WIPO | G02B 5/124 |
| WO 96/05964 | 2/1996 | WIPO | B32B 27/08 |
| WO 96/05965 | 2/1996 | WIPO | B32B 27/28 |
| WO 97/05196 | 2/1997 | WIPO | C08K 5/17 |

OTHER PUBLICATIONS

Fred W. Billmeyer, Jr., Textbook of Polymer Science, Third Edition, pp. 398–406, (1984).
Kirk–Othmer Encyclopedia of Chemical Technology, Third Edition, vol. 8, John Wiley & Sons, pp. 500–515, (1979).
Kirk–Othmer Encyclopedia of Chemical Technology, Third Edition, vol. 11, John Wiley & Sons, pp. 20–71, (1979).
R.A. Brullo, "Fluoroelastomer Rubber for Automotive," Automotive Elastomers & Design (3 pages), (Jun. 1985).
R.A. Brullo, "Fluoroelastomers Seal Up Automotive Future," (5 pages), (1988).
Feiring et al., "Advances in Fluoroplastics,"Materials, Plastics Engineering, pp. 27–30, (1994).
Melvin I. Kohan, "Nylon Plastics,"John Wiley & Sons, pp. 44–47, (1984).
Korshak et al., "Synthetic Hetero–Chain, Polyamides, "Academy of Sciences of the U.S.S.R., pp. 87–93, (1964).
Lunkwitz et al., "Surface Modification of Fluoropolymers," J. Adhesion Sci. Technol., vol. 9, No. 3, pp. 297–310 (1995).
Schonhorn et al., "Adhesive Bonding of Polyvinylidene Fluoride: Effect of Curing Agent in $PVF_2$ Surface Modification,"J. Adhesion Sci, Technol. vol. 3, No. 4, pp. 277–290 (1989).
Cirillo et al., "Fluoroelastomers: Reaction Products in Early Stages of Network Formation," Biological and Synthetic Polymer Networks, pp. 255–265 (1988).
Hull et al., "New Elastomers are More Resistant to Many Automotive Fluids,"SAE Technical Paper Series, pp. 33–44 (1989).
Venkateswarlu et al., "Elucidation of Chemical Events Occuring in the Solid Phase During the Curing of Fluoeoelastomers with Bisphenol AF," (33 pages) (1989).

Primary Examiner—Vivian Chen
Attorney, Agent, or Firm—Daniel C. Schulte

[57] ABSTRACT

A multi-layer article comprises a substantially non-fluorinated layer, and a fluorinated layer of fluoropolymer comprising interpolymerized monomeric units derived from one or more of hexafluoropropylene and tetrafluoroethylene monomers, one or more non-fluorinated olefinically unsaturated monomer, and substantially no vinylidene fluoride monomer. The multi-layer article further comprises an aliphatic di-, or polyamine which provides increased adhesion between the layers as compared to a multi-layer article not containing the aliphatic di-, or polyamine. The multi-layer article can be prepared by mixing the aliphatic di-, or polyamine into the substantially non-fluorinated polymeric material, or by applying the aliphatic di-, or polyamine to a surface of one or more of the substantially non-fluorinated polymeric material or the fluoropolymer, and thereafter preparing a multi-layer article.

37 Claims, No Drawings

MULTI-LAYER COMPOSITIONS COMPRISING A FLUOROPOLYMER

FIELD OF THE INVENTION

The invention relates to multi-layer compositions comprising a fluoropolymer and a substantially non-fluorinated polymeric material. In particular, multi-layer compositions of the present invention comprise a fluoropolymer comprising interpolymerized units derived from monomers including one or more of tetrafluoroethylene and hexafluoropropylene, one or more non-fluorinated olefinically unsaturated monomer, and substantially no vinylidene fluoride monomer. In another aspect, this invention relates to methods of improving the adhesive bond strength between such a fluoropolymer a substantially non-fluorinated polymeric material.

BACKGROUND OF THE INVENTION

Fluorine-containing polymers (i.e., fluoropolymers or fluorinated polymers) are a commercially important class of materials. Many fluoropolymers are known to exhibit high thermal stability and usefulness at high temperatures, as well as extreme toughness and flexibility at very low temperatures. Many fluoropolymers are also almost totally insoluble in a wide variety of organic solvents, and resistant to many chemical compounds that might degrade other classes of less resistant materials. Additionally, many fluoropolymers are recognized for their barrier properties; i.e., their ability to prevent the passage of liquids or vapors.

Increased concerns with evaporative fuel standards have led to a need for fuel system components that have improved barrier properties, to minimize the permeation of fuel vapors through automotive components such as fuel filler lines, fuel supply lines, fuel tanks, and other components of a automobile emission control systems. Multi-layer articles such as multi-layer tubing have been used within these applications. These multi-layer products can comprise a fluorinated layer, which provides an inert, vapor barrier, and one or more other layers that can add strength, rigidity, or other mechanical properties to the multi-layer article. As an example, some multi-layer articles include a fluorinated layer and a layer comprising a substantially non-fluorinated polymer.

To be most useful, these multi-layer articles should not delaminate during use. That is, the adhesive bond strength between the different layers of the multi-layer article should be sufficient to prevent the different layers from separating. A variety of methods have been employed to increase the adhesive bond strength between a layer comprising a fluoropolymer and a layer comprising a substantially non-fluorinated polymer. For example, a layer of adhesive can be added between the two layers. As an alternative to or in addition to adhesives, surface treatment of one or both of the layers has been used to increase the adhesive bond strength between the two types of layers. For example, layers comprising a fluoropolymer have been treated with charged gaseous atmosphere followed by application of a layer of thermoplastic polyamide. As another approach, "tie-layers" have been used to increase the adhesive bond strength between a fluoropolymer and layer comprising a substantially non-fluorinated polymer. A tie layer is a layer comprising a blend of materials from two dissimilar layers disposed between the two dissimilar layers. See e.g., European Patent Application 0523644 (Kawashima et al.).

The adhesion between a substantially non-fluorinated polymer and a fluoropolymer, wherein the fluoropolymer is derived from vinylidene fluoride (VDF) and hexafluoropropylene (HFP), has been found to increase upon exposure of the fluoropolymer to an amine compound. Fluoropolymers derived from VDF and HFP are relatively susceptible to attack by basic materials due to the presence of an electronegative, carbon-bonded, electron-withdrawing —$CF_3$ group (from the HFP) adjacent to a carbon-bonded hydrogen atom provided by the VDF monomer. Amines can therefore be reacted with the VDF/HFP fluoropolymer to increase adhesion of a fluoropolymer to a substantially non-fluorinated substrate.

On the other hand, fluoropolymers derived from fluorinated monomers that include substantially no VDF are known to exhibit superior inertness relative to fluoropolymers derived from VDF monomers, and are consequently more resistant to chemical attack. These fluoropolymers are expected to be inert from attack by a base, and are therefore less apt to undergo adhesion-promoting reactions with amines. Examples of such fluoropolymers include fluoropolymers derived from monomers comprising tetrafluoroethylene (TFE) and/or hexafluoropropylene (HFP), and substantially no vinylidene fluoride monomers.

What is needed, but not provided by the prior art is a method of increasing the adhesive bond strength between a substantially non-fluorinated polymeric material and a fluoropolymer, the fluoropolymer being derived from one or more of TFE and HFP monomers, and one or more non-fluorinated olefinically unsaturated monomers, but substantially no vinylidene fluoride monomer.

SUMMARY OF THE INVENTION

The present invention provides a method for increasing the adhesive bond strength between a fluoropolymer and a substantially non-fluorinated polymeric material. An aspect of the invention relates to a method comprising the steps of: providing a substantially non-fluorinated polymeric material comprising an aliphatic di-, or polyamine and a substantially non-fluorinated polymer; providing a fluoropolymer comprising interpolymerized monomeric units derived from monomers comprising: one or more of hexafluoropropylene and tetrafluoroethylene monomers, one or more non-fluorinated olefinically unsaturated monomer, and substantially no vinylidene fluoride monomer; and, forming a multi-layer article comprising a substantially non-fluorinated layer made of the substantially non-fluorinated polymeric material, and a fluorinated layer made of the fluoropolymer. The substantially non-fluorinated layer and the fluorinated layer are in substantial contact. The aliphatic di-, or polyamine is present in the substantially non-fluorinated layer in an amount sufficient to increase the adhesive bond strength between the two layers compared to a multi-layer article without the aliphatic di-, or polyamine.

As an alternative to providing a substantially non-fluorinated polymeric material comprising a mixture of an aliphatic di-, or polyamine and a substantially non-fluorinated polymeric material, the present invention can also be practiced by applying an aliphatic di-, or polyamine to one or more of the fluoropolymer or the substantially non-fluorinated polymeric material. As such, another aspect of the present invention relates to a method for increasing the adhesive bond strength between a fluoropolymer and a substantially non-fluorinated polymeric material, the method comprising the steps of: providing a substantially non-fluorinated polymeric material; providing a fluoropolymer comprising interpolymerized monomeric units derived from monomers comprising: one or more of hexafluoropropylene and tetrafluoroethylene monomers, one or more non-fluorinated olefinically unsaturated monomer, and substantially no vinylidene fluoride monomer; applying an aliphatic di-, or polyamine to one or more of the substantially non-fluorinated polymeric material and/or the fluoropolymer; and forming a multi-layer article comprising a substantially non-fluorinated layer made of the substantially non-fluorinated polymeric material, and a fluorinated layer made of the fluoropolymer. The two layers are in substantial contact, and the aliphatic di-, or polyamine is applied to one or more of the layers in an amount sufficient to increase the adhesive bond strength between the layers, compared to the adhesive bond strength between the substantially non-fluorinated layer and the fluorinated layer without the aliphatic di-, or polyamine.

In another aspect, the present invention provides a multi-layer article comprising a fluorinated layer, a substantially non-fluorinated layer, and an aliphatic di-, or polyamine. The fluorinated layer is made of a fluoropolymer comprising interpolymerized units derived from monomers comprising one or more of hexafluoropropylene monomer and tetrafluoroethylene monomer, one or more non-fluorinated olefinically unsaturated monomer, and substantially no vinylidene fluoride monomer. The substantially non-fluorinated layer is made up of a substantially non-fluorinated polymeric material that preferably comprises a polyamide, polyimide, polyurethane, or carboxyl-, anhydride-, or imide-functional polyolefin. The aliphatic di-, or polyamine can be present throughout the substantially non-fluorinated layer. Alternatively, substantially all of the aliphatic di-, or polyamine can be located near the interface between the fluorinated layer and the substantially non-fluorinated layer. In either case, the aliphatic di-, or polyamine can be present in an amount sufficient to increase the adhesive bond strength between the fluorinated layer and the substantially non-fluorinated layer, compared to a multi-layer article not including the aliphatic di-, or polyamine.

The methods and compositions of this invention are particularly useful for making multi-layer articles such as tubing and hoses suitable for use in motor vehicles, for example as fuel-line hoses.

DETAILED DESCRIPTION

Fluoropolymers suitable for use in the present invention include fluorinated polymers, copolymers, and terpolymers, etc., comprising interpolymerized units derived from one or more of hexafluoropropylene (HFP) monomers and/or tetrafluoroethylene (TFE) monomers. The fluoropolymer is further comprised of interpolymerized units derived from one or more non-fluorinated olefinically unsaturated monomers. The fluoropolymer is derived from monomers including substantially no vinylidene fluoride (VDF) monomer. By "substantially no vinylidene fluoride," it is meant that the fluoropolymer comprises less than 3 percent of interpolymerized units derived from vinylidene fluoride monomer, more preferably less than about 2 or 1 percent interpolymerized units derived from vinylidene fluoride monomer, and most preferably no interpolymerized units derived from vinylidene fluoride monomer. Useful non-fluorinated olefinically unsaturated monomers include alkylene monomers such as ethylene, propylene, etc.

Fluoropolymers suitable for use in the present invention can be prepared by methods known in the fluoropolymer art. These methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example U.S. Pat. No 4,335,238.

Examples of useful fluoropolymer materials containing interpolymerized units derived from one or more of TFE and HFP, one or more non-fluorinated olefinically unsaturated monomer, and substantially no VDF, include poly(ethylene-co-tetrafluoroethylene) (ETFE), poly(tetrafluoroethylene-co-propylene) (TFEP), poly(chlorotrifluoroethylene-co-ethylene) (ECTFE), and the terpolymer poly(ethylene-co-tetrafluoroethylene-co-hexafluoropropylene) (E/TFE/HFP), among others. These can be prepared by the above-described known polymerization methods. Also, many useful fluoropolymer materials are commercially available, for example from Hoechst AG under the trade designations Hostaflon™ X6810, and X6820, from Daikin America, Inc., under the trade designations Neoflon™ EP-541 EP-521, and EP-610, from Asahi Glass Co. under the trade designations Aflon™ COP C55A, C55AX, C88A,, and From DuPont under the trade designations Tefzel™ 230 and 290.

Useful substantially non-fluorinated polymeric materials can comprise any of a number of well known, substantially non-fluorinated, hydrocarbon-based polymers. As used herein the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms. Preferred substantially non-fluorinated polymers include thermoplastic polyamides, polyurethanes, and polyolefins.

Polyamides useful as substantially non-fluorinated polymer are generally commercially available. For example, polyamides such as any of the well-known Nylons are available from a number of sources. Particularly preferred polyamides include nylon 6, nylon 6,6, nylon 11, and nylon 12. The selection of a polyamide material can be based on the physical requirements of the particular application expected for the resulting multi-layer article. For example, nylon 6 and nylon 6,6 offer relatively better heat resistance than nylon 11 and nylon 12, whereas nylon 11 and nylon 12 offer better chemical resistance. Other nylon materials such as nylon 6,12, nylon 6,9, nylon 4, nylon 4,2, nylon 4,6, nylon 7, and nylon 8 may also be used as substantially non-fluorinated polymer. Or, ring-containing polyamides such as nylon 6,T and nylon 6,I, or polyether-containing polyamides, such as Pebax™ poly-amines, may also be used.

Useful polyurethanes include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol may also optionally be used in the reaction. Commercially available polyurethanes useful in the present invention include: PN-04 or 3429 from Morton International, Inc., Seabrook, N.H., and X-4107 from B.F. Goodrich Company, Cleveland, Ohio.

Polyolefin polymers and copolymers useful as substantially non-fluorinated polymers generally include homopolymers or copolymers of ethylene, propylene, acrylic monomers, or other ethylenically unsaturated monomers, for example, vinyl acetate. Such polymers and copolymers can be prepared by conventional free-radical polymerization of such ethylenically unsaturated monomers. The polymer may be of any crystallinity. For example, the polymer may be a semi-crystalline high density polyethylene, or the polymer may be an elastomeric copolymer of ethylene and propylene. Although not necessary to the performance of the substantially non-fluorinated polymer within the present invention, carboxyl-, anhydride-, or imide- functionalities may be incorporated into the polyolefin polymer or copolymer by polymerizing or copolymerizing functional monomers, for example, acrylic acid or maleic anhydride, or by modifying a polymer after polymerization, for example by oxidation. Such carboxyl-, anhydride-, or imide- functional polymers are generally commercially available. For example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes are available from DuPont as Bynel™ coextrudable adhesive resins.

In one embodiment of the present invention, an aliphatic di-, or polyamine is mixed into the substantially non-fluorinated polymeric material. The term "di-, or polyamine," as used within this description refers to organic compound containing at least two amine groups. By "aliphatic" it is meant that the nitrogen atoms of at least two of the two or more amines in the compound are bonded directly to only hydrogen atoms or aliphatic carbon atoms rather than being bonded directly to aromatic moieties or functional groups (e.g., carboxyl). For example, as "aliphatic di-, or polyamine" is used within the present description, aniline and urea are not aliphatic di-, or polyamines. Secondary amines are more preferred than tertiary amines and primary amines are most preferred. Most preferred aliphatic di-, or polyamines include diamines or di-, or polyamines that comprise at least two primary amines, such as hexamethylene diamine, dodecanediamine, and 2,4,8,10-tetraoxaspiro[5,5]undecane-3,9-dipropanamine.

The aliphatic di-, or polyamine can be of any molecular weight that when used in accordance with the present description, will result in an improvement in the adhesive bond strength between a fluoropolymer and a substantially non-fluorinated polymeric material. As an example, the aliphatic di-, or polyamine may have a weight average molecular weight of below 5,000, more preferably below 2,000, or 1,000, as measured by gel permeation chromatography (GPC).

The aliphatic di-, or polyamine can be dispersed throughout the substantially non-fluorinated polymeric material, and can be present in any amount that will result in an increased adhesive bond strength between the fluoropolymer and the substantially non-fluorinated polymeric material. For instance, the aliphatic di-, or polyamine can be present in the substantially non-fluorinated polymeric material in an amount in the range from about 0.1 to 10 parts by weight aliphatic di-, or polyamine, based on 100 parts by weight non-fluorinated polymeric material. Preferably the aliphatic di-, or polyamine is present in the substantially non-fluorinated polymeric material in an amount in the range from about 0.5 to 3 parts by weight, based on 100 parts non-fluorinated polymeric material.

While wishing not to be bound by theory, it is thought that in some cases, the aliphatic di-, or polyamine may react with the substantially non-fluorinated polymer. For instance when the substantially non-fluorinated polymer comprises a nylon, a diamine such as DDDA or hexamethylenediamine may attack the nylon and cleave the relatively high molecular weight nylon polymer into a number of relatively lower molecular weight diamines. See for example Melvin I. Kohan, *Nylon Plastics,* p. 13–82 (1973); V. V. Korshak and T. M. Frunze, *Synthetic Hetero-Chain Polyamides,* pp.87–92 (1964). The diamines resulting from cleavage of the nylon might contribute further to the improvement in adhesion between the fluoropolymer and the substantially non-fluorinated polymeric material.

The substantially non-fluorinated polymeric material may optionally further comprise one or more tackifiers to improve inter-layer adhesion between the substantially non-fluorinated polymeric material and the fluoropolymer. Although suitable tackifiers vary greatly in chemical structure, the most useful tackifiers generally will have a softening point between approximately 90° C. and 150° C. Preferably, tackifiers used in accordance with this invention are combined along with a suitable aliphatic di-, or polyamine, and are mixed into the substantially non-fluorinated polymer to produce the substantially non-fluorinated polymeric material. By this method, the tackifier can be present in the substantially non-fluorinated polymeric material in an amount in the range from about 1 to 50 parts by weight tackifier based on 100 parts substantially non-fluorinated polymer.

Useful tackifiers include any of the tackifier compounds known to improve adhesion performance characteristics of elastomer-based adhesives. Such compounds include, for example rosins, including gum rosins, tall oil rosins, wood rosins, polymerized rosins, hydrogenated rosins, and disproportionated rosins; rosin esters, including pentaerythritol-wood rosins, pentaerythritol-stabilized rosins, and glycerine-hydrogenated wood rosins; hydrocarbon resins, including aliphatic and cycloaliphatic resins, aromatic resins, petroleum resins, and dicyclopentadiene; terpenes, including alpha-pinene, beta-pinene, d-limonene, and polyterpenes; and pure monomer resins, including styrene resins, styrene/AMS resins, and AMS/vinyl toluene resins. Commercially available tackifiers useful in this invention include Arkon™ P-125 tackifier, a hydrogenated C9 aromatic hydrocarbon, and Super Ester™ W-125 modified rosin ester tackifier, both available from Arakawa Chemical USA., Inc.; and Piccolyte™ S115 terpene resin tackifier, available from Hercules, Inc.

The aliphatic di-, or polyamine (and optionally any tackifier) may be incorporated into the substantially non-fluorinated polymer by conventional means. For example, the aliphatic di-, or polyamine can be melt-processed with the substantially non-fluorinated polymer to produce a substantially non-fluorinated polymeric material Methods known in the fluoropolymer art can be used to produce a bonded multi-layer article wherein the fluoropolymer material is in substantial contact with the substantially non-fluorinated polymeric material. For instance, the fluoropolymer and the substantially non-fluorinated polymeric material can be formed by known methods into thin film layers. The fluorinated layer and the substantially non-fluorinated layer can then be laminated together under heat and/or pressure to form a bonded, multi-layer article. Alternatively, the fluoropolymer and the substantially non-fluorinated polymeric material can be co-extruded into a multi-layer article. See e.g., U.S. Pat. Nos. 5,383,087, and 5,284,184.

The heat and pressure of the method by which the layers are brought together (e.g., coextrusion or lamination) may be sufficient to provide adequate adhesion between the layers. However, it may be desirable to further treat the resulting multi-layer article, for example with additional heat, pressure, or both, to provide further adhesive bond strength between the layers. One way of supplying additional heat when the multi-layer article prepared by extrusion is by delaying the cooling of the multi-layer article after co-extrusion. Alternatively, additional heat energy may be added to the multi-layer article by laminating or coextruding the layers at a temperature higher than necessary for merely processing the several components. Or, as another alternative, the finished multi-layer article may be held at an elevated temperature for an extended period of time. For example the finished multi-layer article may be placed in a separate means for elevating the temperature of the article, such as an oven or heated liquid bath. A combination of these methods may also be used.

In another aspect of the present invention the aliphatic di-, or polyamine need not be mixed into the substantially non-fluorinated polymeric material in order to achieve increased adhesive bond strength between the fluoropolymer and the substantially non-fluorinated polymeric material. As an alternative to adding the aliphatic di-, or polyamine to the substantially non-fluorinated polymeric material, the aliphatic di-, or polyamine can be applied as a coating to one or more surfaces of the substantially non-fluorinated layer, and/or a surface of fluoropolymer. Then, the coated side or sides of the fluoropolymer or polymeric materials are contacted together to form a multi-layer article, with improved adhesion between the layers being achieved. In this embodiment, aliphatic di-, or polyamine is present in the multi-layer article at the interface between the fluorinated layer and the substantially non-fluorinated layer of a multi-layer article prepared by the method of the invention. But, the aliphatic di-, or polyamine need not be present, and is preferably not present throughout the balance of the substantially non-fluorinated polymeric material.

The aliphatic di-, or polyamine can be applied to a surface of the fluoropolymer or substantially non-fluorinated layer by brushing a solution of the aliphatic di-, or polyamine onto the fluoropolymer or the substantially non-fluorinated layer. Alternatively, the aliphatic di-, or polyamine can be applied by any other useful coating method; e.g., spray coating, curtain coating, immersion, or dipping, etc. By this method, a reduced amount of the aliphatic di-, or polyamine is needed to provide increased adhesive bond strength compared to when the aliphatic di-, or polyamine is mixed into the substantially non-fluorinated polymeric material, because only a surface of the fluorinated layer or the substantially non-fluorinated layer needs to be coated with the aliphatic di-, or polyamine. After coating the aliphatic di-, or polyamine onto one or more of the substantially non-fluorinated layer or the fluorinated layer, the layers can be processed by known methods to form a multi-layer article; e.g., by lamination methods or by sequential extrusion methods that include a coating step.

The methods of the present invention provide multi-layer articles having improved inter-layer adhesive bond strength between a fluorinated layer and a substantially non-fluorinated layer. Multi-layer articles of the present invention can have usefulness as films, containers, or tubing that require specific combinations of barrier properties, high and low temperature resistance, and chemical resistance. The methods and compositions of this invention are particularly useful for making multi-layer articles suitable for use in motor vehicles, for example as fuel-line hoses, and for films and blow-molded articles such as bottles, where chemical resistance and barrier properties are important.

The multi-layer articles of the present invention can have two, three, or even more separate layers. For example, the present invention contemplates a multi-layer article including a fluorinated layer, a substantially non-fluorinated layer, and optionally further comprising one or more additional layers comprising fluorinated or non-fluorinated polymers. As a specific example, a bi-layer article can be prepared according to the present invention, the bi-layer article comprising a fluorinated layer and a substantially non-fluorinated layer, wherein an aliphatic di-, or polyamine is used to increase the adhesive bond strength between the two layers. One or more additional layers comprising fluorinated or non-fluorinated polymer can thereafter be bonded to one or more of the fluorinated layer or substantially non-fluorinated layer of the bi-layer article, to produce a multi-layer article having three or more layers.

The present invention will now be described by the following non-limiting examples.

EXAMPLES

In the following Examples and Comparative Examples various multi-layer compositions were prepared and the adhesion between the layers was evaluated. All concentrations and percentages are by weight unless otherwise indicated.

Example 1

In Example 1, a 10 centimeter (cm) by 10 cm by 20 mils (508 micrometer) thick sheet of diamine-containing nylon 12 was prepared by melting 46 g of Ube nylon 12 3014U (approximate molecular weight 15,000), available from UBE Industry, using a Rheomix™ 600 internal bowl mixer equipped with roller blades, available from Haake Buchler Instruments Inc., at a temperature of 200° C. and a mixer rotor setting of 10 revolutions per minute (rpm). After mixing the melted nylon 12 for 1 minute, 0.23 g of 1,12-dodecanediamine (DDDA), available from Aldrich Chemical Co., Inc., was mixed into the melted nylon 12. During the next 2 minutes, the temperature was gradually cooled to 180° C. and the speed of the mixer rotor was increased to 50 rpm. Mixing continued at this temperature and rotor speed for 3 minutes. The diamine-containing nylon 12 was then removed from the mixer and molded at 177° C. into a sheet about 20 mils (508 micrometer) thick using a 20 mil shim stock and a heated platen press from Wabash Hydraulic Press Co. After cooling to room temperature, the sheet was cut into a 10 cm by 10 cm square.

Sheets 10 cm by 10 cm by 10 mil (254 micrometer) thick poly(tetrafluoroethylene-co-ethylene) (ETFE), were prepared by the same procedure as with the diamine-containing nylon 12 sheets above, except that a 10 mil shim stock and 300° C. heat press were used. ETFE Neoflon™ EP-610 is available from Daikin America, Inc.

Adhesion samples were prepared from the sheet of di-amine-containing nylon 12, and 3 sheets of the 10 mil thick poly(ETFE). Three sheets of the 10 mil thick poly (ETFE) were laminated together (for a total poly(ETFE) film thickness of 10 mils) and were laminated to the di-amine-containing nylon 12, using a heated platen press (from the Wabash Hydraulic Press Co.) at 250° C. and 3.5 psi (24 kPa) for 3 minutes. The samples were removed from the press and allowed to cool to room temperature. To facilitate testing via the T-peel test, a sheet of 3 mil (76.2 micrometer) thick PTFE (poly(tetrafluoroethylene)) film was placed between the ETFE and the nylon 12 about 2.5 cm into the square sheets, and along one edge of the square sheets. The PTFE did not adhere to either of the other two layers and was used only to create tabs of the other layers to insert into the jaws of the adhesion testing device.

The sample were cut into three (3) strips of one-inch (2.54 cm) width. Adhesion strength values of the three laminated samples were measured according to ASTM D 1876. An Instron™ Model 1125 tester, available from Instron Corp., set at a 100 mm/min crosshead speed was used as the test device. If there were many peaks recorded on the graph from the T-peel test, the peel strength was calculated in accordance with ISO 6133-81. Results are provided in Table 1.

Example 2

In Example 2, Adhesion Samples were prepared and tested as in Example 1 except that the press temperature during lamination was 300° C., and press time during lamination was 5 minutes. Test results and process conditions are summarized in Table 1.

Examples 3 and 4

In Examples 3 and 4, samples were prepared and tested as in Example 1 except E/TFE/HFP (a terpolymer of ethylene (E), tetrafluoroethylene (TFE) and hexafluoropropylene (HFP)) made from resin available from Hoechst AG as Hostaflon™ X6810 (melting point 160° C.) was used as the fluoropolymer. Test results and process conditions are summarized in Table 1.

Examples 5 and 6

In Examples 5 and 6, samples were prepared and tested as in Example 1 except E/TFE/HFP (a terpolymer of ethylene (E), tetrafluoroethylene (TFE) and hexafluoropropylene (HFP)) made from resin available from Hoechst AG as Hostaflon™ X6820 (melting point 205° C.) was used as the fluoropolymer. Test results and process conditions are summarized in Table 1.

Comparative Example C7

In Comparative Example C7, a sample was prepared and tested as in Example 1 except the ETFE sheet was applied to a nylon 12 sheet not containing a di-amine. Test result and process conditions are summarized in Table 1.

Comparative Examples C8 and C9

In Comparative Examples C8 and C9, samples were prepared and tested as in Example 1 except that the E/TFE/HFP sheets were applied to a nylon 12 sheet not containing a di-amine. Test results and process conditions are summarized in Table 1.

TABLE 1

| Example | fluoropolymers | diamine (%) | Lamination Temp (°C.) | Lamination Time (min) | peel strength (kg/2.54 cm) |
|---|---|---|---|---|---|
| 1 | ETFE Neoflon ® EP-610 | 1.0 | 250 | 3 | 0.5 |
| 2 | ETFE Neoflon ® EP-610 | 1.0 | 300 | 5 | 2.0 |
| 3 | X6810 | 1.0 | 250 | 0.5 | 0.5 |
| 4 | X6810 | 1.0 | 250 | 3 | 4.5 |
| 5 | X6820 | 1.0 | 250 | 0.5 | 0.1 |
| 6 | X6820 | 1.0 | 250 | 3 | 1.0 |
| C7 | ETFE Neonflon ® EP-610 | — | 300 | 5 | — |
| C8 | X6810 | — | 250 | 3 | — |
| C9 | X6820 | — | 250 | 3 | — |

In Table 1, a dash ("-") indicates that the layers of the Sample exhibited no adhesion to each other, and therefore no test could be performed.

The data in Table 1 show that the present invention is useful to create and/or increase the adhesive bond strength between a non-fluorinated material, and a fluoropolymer derived from TFE, HFP, and substantially no VDF.

Example 7

In Example 7, a 10 by 10 centimeter polyamine-containing nylon 12 sheet was prepared by melting 235 grams of Grilamid™ L25 nylon 12 (from EMS-Chemie AG), using a Rheomix™ 300 internal bowl mixer equipped with roller blades, available from Haake Mess-Technik GmbH u. Co., set at a temperature of 230° C. and a mixer rotor setting of 10 rpm. After mixing the melted nylon 12 for 3 minutes, 11.87 grams (1 wt %) of 20 wt % polyallylamine aqueous solution, PAA-H (approximate molecular weight 100,000), available from Nitto Bouseki Co., Ltd., was added by dropper and mixed into the nylon 12. During the next 2 minutes, the speed of the mixer rotor was increased to 25 rpm. The temperature and the rotor speed were then held for 3 minutes. The mixture was removed from the mixer and molded at 230° C. into a sheet of about 508 micrometer thickness. After cooling to room temperature, the sheet was cut into 10 cm by 10 cm squares. A multi-layer article was prepared with the sheet of nylon 12/diamine and 254 micrometer thick sheets of E/TFE/HFP fluoropolymer (Hostaflon™ X6810 from Hoechst AG) by laminating the fluoropolymer to the nylon 12/diamine at 250° C. and 300 kPa for 3 minutes. The sample was removed from the press and allowed to cool to room temperature. The sample was then cut to three (3) 2.54 cm strips. The adhesion between the layers was tested according to ASTM D-1867 using a Tensiometer™ 10 adhesion tester, available from Monsanto Corp., at a crosshead speed of 100 mm/min. Where many peaks were recorded, the peel strength was calculated according to ISO 6133-'81. The values reported were the average of testing three samples, with the average peel strength being 1.2 kg per 2.54 cm.

What is claimed is:
1. A multi-layer article comprising
   a substantially non-fluorinated layer,
   and a fluorinated layer of fluoropolymer comprising interpolymerized monomeric units derived from
     one or more of hexafluoropropylene and tetrafluoroethylene monomers,
     one or more non-fluorinated olefinically unsaturated monomer, and substantially no vinylidene fluoride monomer; the multi-layer article further comprising an aliphatic di-, or polyamine, the aliphatic di-, or polyamine providing increased adhesion between the layers as compared to a multi-layer article not containing the aliphatic di-, or polyamine.

2. The multi-layer article of claim 1, wherein the aliphatic di-, or polyamine has a molecular weight of less than 5,000.

3. The multi-layer article of claim 1, wherein the aliphatic di-, or polyamine has a molecular weight of less than 1,000.

4. The multi-layer article of claim 1, wherein the substantially non-fluorinated layer is made of a substantially non-fluorinated polymeric material comprising a substantially non-fluorinated polymer selected from the group consisting of a polyamide, polyimide, a polyurethane, a carboxyl-, anhydride-, or imide-functional polyolefin, and mixtures thereof.

5. The multi-layer article of claim 1, wherein the non-fluorinated olefinically unsaturated monomer is chosen from the group consisting of: ethylene, propylene, and mixtures thereof.

6. The multi-layer article of claim 1, wherein the fluoropolymer is a polymer of interpolymerized monomeric units derived from monomers consisting essentially of tetrafluoroethylene and ethylene.

7. The multi-layer article of claim 1, wherein the fluoropolymer is a polymer of interpolymerized monomeric units derived from monomers consisting essentially of tetrafluoroethylene and propylene.

8. The multi-layer article of claim 1, wherein the fluoropolymer is a polymer of interpolymerized units derived from monomers consisting essentially of tetrafluoroethylene, hexafluoropropylene, and ethylene.

9. The multi-layer article of claim 1, wherein the aliphatic di-, or polyamine is present throughout the substantially non-fluorinated polymer.

10. The multi-layer article of claim 1, wherein the multi-layer article is a hose or a container.

11. The multi-layer article of claim 1, wherein the fluoropolymer is a fluoroplastic, the substantially non-fluorinated polymer is thermoplastic, and the aliphatic di-, or polyamine is an alkylene di-primary amine.

12. A chemically resistant multi-layer article comprising:
  a substantially non-fluorinated layer,
  and a fluorinated layer of fluoropolymer comprising interpolymerized monomeric units derived from
    one or more of hexafluoropropylene and tetrafluoroethylene monomers,
    one or more non-fluorinated olefinically unsaturated monomer,
    and substantially no vinylidene fluoride monomer;
  the multi-layer article further comprising an aliphatic di-, or polyamine, the aliphatic di-, or polyamine providing increased adhesion between the layers as compared to a multi-layer article not containing the aliphatic di-, or polyamine.

13. The multi-layer article of claim 12, wherein the multi-layer article is a hose, tube, or container.

14. A method for increasing the adhesive bond strength between a fluoropolymer and a substantially non-fluorinated polymeric material, the method comprising the steps of:
  (a) providing a substantially non-fluorinated polymeric material comprising an aliphatic di-, or polyamine and a substantially non-fluorinated polymer;
  (b) providing a fluoropolymer comprising interpolymerized monomeric units derived from monomers comprising:
    one or more of hexafluoropropylene and tetrafluoroethylene monomers,
    one or more non-fluorinated olefinically unsaturated monomer, and
    substantially no vinylidene fluoride monomer; and
  (c) forming a multi-layer article comprising a substantially non-fluorinated layer made of the substantially non-fluorinated polymeric material contacting a fluorinated layer made of the fluoropolymer, wherein the aliphatic di-, or polyamine is present in the substantially non-fluorinated layer in an amount sufficient to increase the adhesive bond strength between the two layers compared to a multi-layer article without the aliphatic di-, or polyamine.

15. The method of claim 14, wherein the aliphatic di-, or polyamine has a molecular weight of less than 5,000.

16. The method of claim 14, wherein the aliphatic di-, or polyamine has a molecular weight of less than 1,000.

17. The method of claim 14, wherein the aliphatic di-, or polyamine comprises an alkylene di-primary amine.

18. The method of claim 14, wherein the aliphatic di-, or polyamine is chosen from the group consisting of hexamethylene diamine and dodecanediamine.

19. The method of claim 14, wherein the substantially non-fluorinated polymer comprises at least one selected from the group consisting of a polyamide, a polyimide, a polyurethane, and a carboxyl-, anhydride-, or imide-functional polyolefin.

20. The method of claim 19, wherein the polyamide is a nylon.

21. The method of claim 14, wherein the substantially non-fluorinated polymer is thermoplastic.

22. The method of claim 14, wherein the non-fluorinated olefinically unsaturated monomer is chosen from the group consisting of ethylene, propylene, and mixtures thereof.

23. The method of claim 14, wherein the fluoropolymer is a polymer of interpolymerized monomeric units derived from monomers consisting essentially of tetrafluoroethylene and ethylene.

24. The method of claim 14, wherein the fluoropolymer is a polymer of interpolymerized monomeric units derived from monomers consisting essentially of tetrafluoroethylene and propylene.

25. The method of claim 14, wherein the fluoropolymer is a polymer of interpolymerized units derived from monomers consisting essentially of tetrafluoroethylene, hexafluoropropylene, and ethylene.

26. The method of claim 14, wherein forming step (c) includes the step of co-extruding the two layers to form a multi-layer article.

27. The method of claim 14, wherein forming step (c) includes the process of laminating the two layers under conditions of heat and/or pressure to form a multi-layer article.

28. The method of claim 14, further comprising the step of applying one or more additional polymer layers to a surface of the resulting multi-layer composition.

29. A method for increasing the adhesive bond strength between a fluoropolymer and a substantially non-fluorinated polymeric material, the method comprising the steps of:
  (a) providing a substantially non-fluorinated polymeric material;
  (b) providing a fluoropolymer comprising interpolymerized monomeric units derived from monomers comprising:
    one or more of hexafluoropropylene and tetrafluoroethylene monomers, one or more non-fluorinated olefinically unsaturated monomer, and substantially no vinylidene fluoride monomer;

(c) applying an aliphatic di-, or polyamine to one or more of the substantially non-fluorinated polymeric material and/or the fluoropolymer; and (d) forming a multi-layer article comprising a substantially non-fluorinated layer made of the substantially non-fluorinated polymeric material contacting a fluorinated layer made of the fluoropolymer; wherein the aliphatic di-, or polyamine is applied to one or more of the substantially non-fluorinated layer and/or the fluorinated layer in an amount sufficient to increase the adhesive bond strength between the substantially non-fluorinated layer and the fluorinated layer compared to the adhesive bond strength between the substantially non-fluorinated layer and the fluorinated layer without the aliphatic di-, or polyamine.

30. The method of claim 29, wherein the aliphatic di-, or polyamine has a molecular weight of less than 5,000.

31. The method of claim 29, wherein the aliphatic di-, or polyamine has a molecular weight of less than 1,000.

32. The method of claim 29, wherein the non-fluorinated olefinically unsaturated monomer is chosen from the group consisting of: ethylene, propylene, and mixtures thereof.

33. The method of claim 29, wherein the fluoropolymer is a polymer of interpolymerized monomeric units derived from monomers consisting essentially of tetrafluoroethylene and ethylene.

34. The method of claim 29, wherein the fluoropolymer is a polymer of interpolymerized monomeric units derived from monomers consisting essentially of tetrafluoroethylene and propylene.

35. The method of claim 29, wherein the fluoropolymer is a polymer of interpolymerized units derived from monomers consisting essentially of tetrafluoroethylene, hexafluoropropylene, and ethylene.

36. A method of using a multi-layer article, comprising the steps of:

providing a fluid;

providing a multi-layer article comprising:
 a substantially non-fluorinated layer,
 and a fluorinated layer of fluoropolymer comprising interpolymerized monomeric units derived from
  one or more of hexafluoropropylene and tetrafluoroethylene monomers,
  one or more non-fluorinated olefinically unsaturated monomer,
  and substantially no vinylidene fluoride monomer;
 the multi-layer article further comprising an aliphatic di-, or polyamine, the aliphatic di-, or polyamine providing increased adhesion between the layers as compared to a multi-layer article not containing the aliphatic di-, or polyamine; and contacting the fluid with the multi-layer article.

37. The method of claim 36, wherein the fluid is a vapor.

* * * * *